No. 823,941. PATENTED JUNE 19, 1906.
R. H. FETTA.
CHEMICAL INJECTOR FOR STEAM BOILERS.
APPLICATION FILED AUG. 11, 1905.
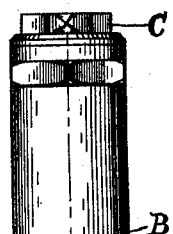
Fig. 1.
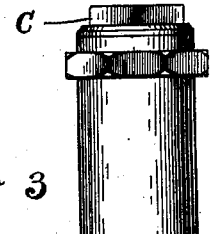
Fig. 3.
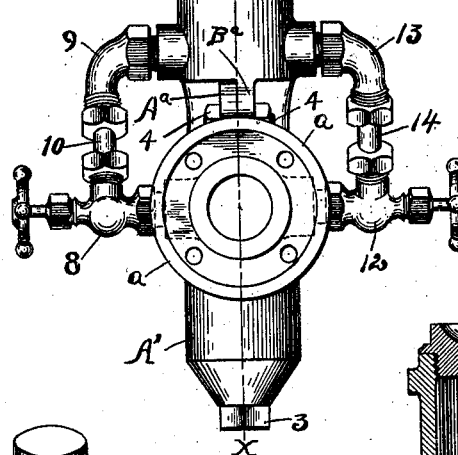
Fig. 5. Fig. 2.
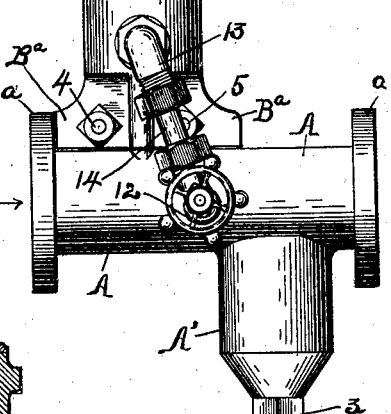
Fig. 4.
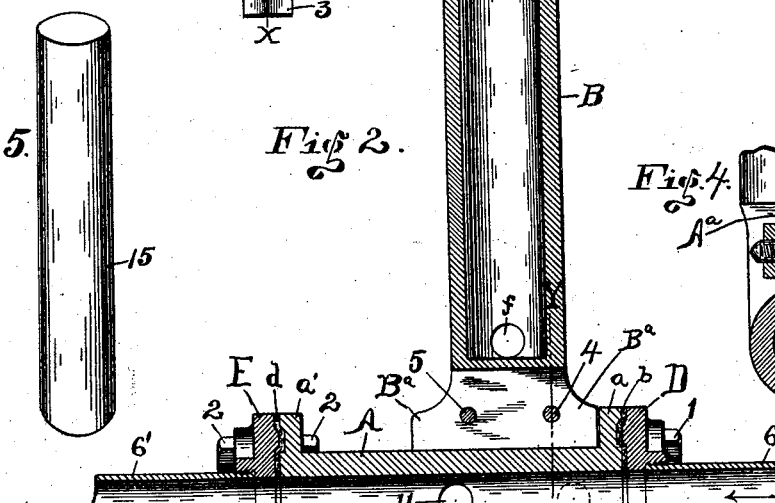
Witnesses
Adelaide Hearne
R. E. Randle
Inventor
R. H. Fetta
By Robert W. Randle
Attorney.

UNITED STATES PATENT OFFICE.

ROBERT H. FETTA, OF RICHMOND, INDIANA.

CHEMICAL-INJECTOR FOR STEAM-BOILERS.

No. 823,941.

Specification of Letters Patent.

Patented June 19, 1906.

Application filed August 11, 1905. Serial No. 273,713.

*To all whom it may concern:*

Be it known that I, ROBERT H. FETTA, a citizen of the United States, residing in the city of Richmond, in the county of Wayne and State of Indiana, have invented a new and useful Chemical - Injector for Steam-Boilers, of which the following is a specification, which when taken in connection with the accompanying drawings, forming a part thereof, will be found to be sufficiently clear and concise as to enable others skilled in the art to which it relates to make and use the same.

The object of my present invention, broadly speaking, is the provision of an initial chemical-injector for steam-boilers or the like having means for the better accomplishment of the insertion of chemical compositions into steam-boilers, in which a maximum of efficiency will be developed with a minimum of mechanical parts, while at the same time providing a device which is neat and attractive in appearance, compact and symmetrical in proportions, strong and durable in construction, positive in action, and which will be substantially automatic in its operation.

A more specific object is to provide a device by the interposition of which a solidified chemical compost may be dissolved with the feed-water before entering the boiler, and thereby be evenly diffused to all parts of the interior of the boiler, also employing the feed-water as the propellant and the vehicle for the compost.

A further object is to provide a chemical compost for steam-boilers and a device for properly accomplishing the desired chemical reaction and the delivery of the product to the flowing feed-water, whereby it may be evenly and economically distributed to the interior of the steam-boiler in discretionary amounts; and, finally, further objects are to provide a chemical-injector for steam-boilers or the like which may be easily connected to and become a part of the feed-water pipe, to provide a solidified chemical compost therefor to be dissolved by action thereon of water and thereby become aqueous in character, to provide means for controlling the dissolution of the compost and for differentiating and controlling its admission to the boiler, to provide means whereby the operator may ascertain the extent to which the compost is entering the boiler, to provide means for the expurgation of sediment which may accumulate in the chamber therefor, to provide means for containing a quantity of the compost in the device, and to provide means for feeding the solidified compost by pregravitation to the point for its dissolution.

Other particular objects and specific advantages of my invention will be made apparent in the course of the ensuing specification.

The distinguishing features of my invention, briefly stated, consist in the relatively horizontal cylinder forming a part of the feed-pipe, the relatively vertical chemical-chamber, the downwardly-projecting settling-chamber, the valve-controlled inlet for the chemical-chamber, the valve-controlled outlet for the chemical-chamber, the system of shunting a portion of the feed-water from the feed-pipe through the lower end of the chemical-chamber and back to the feed-pipe by way of said inlet and outlet pipes, the especially-prepared form and condition of the chemical ingredient whereby it is made into compact sticks, the means for inclosing the conditioned chemical compost in the chemical-chamber, the means whereby the chemicals are fed downward in the chemical-chamber, the means for connecting my device with a feed-water pipe, and the shape and construction of the several parts, together with the accessory elements, all of which will presently be explained in concrete detail.

Probably the best exemplification of the possibilities, construction, and operation of my invention is shown in the accompanying drawings, in which—

Figure 1 shows an end elevation of the preferred embodiment of my invention, showing the inlet end thereof. Fig. 2 is a central longitudinal section taken on line X X of Fig. 1. Fig. 3 is a side elevation of my invention. Fig. 4 is a detail section taken on line Y Y of Fig. 2, and Fig. 5 is a view of the solidified chemical for use in connection with this device.

Similar indices refer to and denote like parts throughout the several views of the drawings.

In order that my invention may be the more fully understood and its operations comprehended and appreciated, I will now take up a detail description thereof and will refer to the various parts as briefly and compactly as I may.

In the drawings the letter A denotes the cylindrical body of my device, having a central fluid-space therethrough, which is of substantially the same interior dimension in cross-section as that of the feed-water pipe to which my device is to be connected. On the inlet and outlet ends of the body A and integral therewith are the respective antipodal flanges or heads $a$ and $a'$, which provide relatively large faces on the ends thereof at right angles to the axial direction of the body A and forming each a member of a coupling, as will presently be made apparent. A plurality of bolt-apertures are formed through each of the said flanges $a$ and $a'$, which apertures are parallel with the body A, and they are adapted to receive therethrough the bolts 1 and 2, respectively.

Integrally connected with and extending down from the body A, being located toward one end thereof, is the settling-chamber A′, which has an interior space opening into the interior of the body A, its lower portion converging with a central threaded vertical aperture which may be closed by the screw-plug 3. Rising from the body A opposite from said settling-chamber and integral with the body A is the flange $A^a$, which extends in an axial direction from near the flange $a$ to slightly beyond the center of the body A, and through said flange are formed bolt-apertures for the bolts 4 and 5.

The letter B designates the chemical-chamber, which also acts as an air-chamber, having a flange $B^a$ integral therewith extending down from its lower end corresponding to and adapted to overlap and contact with said flange $A^a$ of the body, and bolt-apertures are formed therethrough coinciding with the bolt-apertures in the flange $A^a$ to receive said bolts 4 and 5, by which the flanges $A^a$ and $B^a$ are united, whereby the chemical-chamber is supported vertically, as shown. The chemical-chamber has an interior space extending from above the flange $B^a$ to the upper end thereof, being round in cross-section with its upper end adapted to be tightly closed by the screw-cap C, as shown.

The letter D denotes a head corresponding substantially with the flange $a$ of the body A, to which it may be detachably connected by the bolts 1, which bolts pass through apertures therefor in the flange portion of said head and through said apertures therefor in the flange $a$, whereby a union is formed which may be made absolutely air and water tight by the employment of a gasket $b$, placed between the faces, as shown. A threaded aperture is formed through the head D in an axial direction to receive the threaded end at that point of the inlet feed-water pipe 6.

The indice E denotes a head corresponding substantially with the flange $a'$ of the body A, to which it may be detachably connected by the bolts 2, which bolts pass through apertures therefor in the flange portion of said head and through said apertures therefor in the flange $a'$, whereby a union is formed which may be made absolutely air and water tight by the employment of a gasket $d$, placed between the faces, as shown. A central threaded aperture is formed through the head E in an axial direction to receive the threaded end at that point of the outlet feed-water pipe 6′.

In the side of the body A is a threaded aperture located near the inlet end and opening into the interior of the body A, (not appearing in the drawings, but its position being indicated by the dotted circular line 7 in Fig. 2,) into which is fitted the right-angle hand-operative valve 8. Extending through the wall of the side of the chemical-chamber at its lower end is a threaded aperture, in which is fitted the right-angle fitting 9. The free ends of the fitting 9 and the valve 8 are located on a line with and their ends directly facing each other, as shown, and they are connected by the nipple 10, which may be of metal or glass, in any well-known manner, whereby interior communication is established from the interior of the body A to the interior of the chemical-chamber B, substantially as shown. Similar to the above, in the side of the body A near its center is a threaded aperture 11, (shown in Fig. 2,) opening into the interior of the body A, into which aperture is fitted the right-angle hand-operative valve 12. Extending through the wall of the side of the chemical-chamber, at the lower end thereof and opposite to said aperture therein for the fitting 9, is the threaded aperture $f$, in which is fitted the right-angle fitting 13. The free ends of the fitting 13 and the valve 12 are located on a line with each other and with their ends directly facing each other, as shown in Fig. 3, and they are connected by the glass tube or nipple 14 in any well-known manner, whereby interior communication is established from the interior of the chemical-chamber B to the interior of the body A. At this point it should be noticed that the diverted stream of water which flows through the chemical-chamber has its outlet in advance of the inlet therefor—that is to say, it is taken from the main body of feed-water at a point farther from the boiler than is the point where it is returned to the main body of feed-water, whereby the water which passes into the chemical-chamber cannot return and pass therethrough the second time.

The numeral 15 denotes a stick of my solidified chemical, as shown in Fig. 5, which when dissolved and injected into the boiler will prevent the accumulation of incrustations and corrosions due to the harmful chemicals held in solution in the water, which eat out and destroy the boiler metal, while the crust-forming sediments produce scale deposits impervious to heat.

Operation: It is apparent that if the pipe 6' be connected to the boiler (not shown) and the pipe 6 be connected to source of water-supply, (not shown,) the valves 8 and 12 being closed and the cap C being positioned as shown, the feed-water may uninterruptedly flow through the body of my device in the direction indicated by the arrows. Should the valves 8 and 12 be opened, it will be seen that a portion of the feed-water will be diverted through the lower end of the chemical-chamber and then return again to the main body, the amount so diverted depending somewhat on how the valves 8 and 12 are set. It will now be understood that if before opening the valves 8 and 12 the cap C be removed and a stick of the solidified chemical 15 be inserted in the chemical-chamber and the cap replaced the lower end of the stick of chemical will rest on the bottom of the chemical-chamber by pregravitation in the path of the flow of water through the chemical-chamber, and thus when the valves are opened causing that portion of the chemical-stick to become saturated with and be slowly dissolved by the flowing water, which is usually warm, and the dissolved particles will be carried to the feed-water pipe and by it conveyed to the interior of the boiler. The interior of the chemical-chamber being tightly closed at its upper end, it will act as an air-chamber, thus preventing the water from rising therein, thus preventing all of the chemical-stick from becoming saturated at one time, but only as its lower end comes in contact with the flowing water. By means of the glass tube 14 the attendant will be enabled at all times to judge of the amount of the chemical passing thereby, and consequently arrange his valves 8 and 12 accordingly in order to hasten or retard the interaction of the chemical and the water.

The settling-chamber A' is for the purpose of catching and retaining undissolvable particles either from the chemical-chamber or from water-supply, from which chamber they may be taken by the removal of the plug 3, which can be accomplished either by gravity or expulsively.

From the above it is plain that my device will not become inoperative through wear and will not require an expert to install and operate it and that it will be able to otherwise accomplish the various objects previously set forth herein, and while I have illustrated and described the best means now known to me for carrying out the principles of my invention I desire that it be fully understood that I do not restrict myself to the exact details of construction shown, but hold that differentiations and variations therein as would suggest themselves to the ordinary mechanic would clearly fall within the limits and scope of my invention, as various changes and modifications of my invention are required in order to meet varying conditions, whereas the principles involved remain unchanged.

Having now fully shown and described my invention and the preferred manner for its construction, what I claim, and desire to secure by Letters Patent of the United States, is—

1. In a feed-water purifier for steam-boilers, the combination with the feed-water pipe, of a vertically-elongated chamber relatively small in horizontal section, a stick of solidified chemical compost held in vertical position in said chamber, an air-tight closure for the upper end of the chamber, separate inlet and outlet ducts both opening at the bottom of said chamber and communicating with the feed-water pipe below the level of the chamber and at different points in the length of the pipe to maintain a flow through the bottom portion only of the chamber, whereby the compost in the upper portion of the chamber will be held above the water-level and remain unacted on until the lower portion is dissolved; substantially as described.

2. In a feed-water purifier for steam-boilers, the combination with the feed-water pipe, of a vertically-elongated chamber relatively small in horizontal section for a stick of solidified chemical compost, and located above the feed-water pipe, an air-tight closure for the upper end of the chamber, inlet and outlet ducts both opening into the chamber at the bottom and on opposite sides thereof and extending down and entering the feed-water pipe at different points in the length of the latter to maintain a flow through the bottom portion only of the chamber; substantially as described.

3. A fitting adapted to be inserted in and form part of a feed-water pipe for a steam-boiler and having two vertically-arranged chambers at different points in its length, one on the upper and the other on the under side of the fitting, the chamber on the under side of the fitting being nearest the end next the boiler and opening directly into the fitting to form a sediment-trap and the chamber on the upper side of the fitting having inlet and outlet ducts both opening into the bottom of the chamber and on opposite sides thereof and extending down and entering the fitting at different points in its length but at points in advance of the lower chamber whereby sediment from the upper chamber will be caught in the lower chamber; substantially as described.

In testimony whereof I have hereunto signed my name to this specification in the presence of two subscribing witnesses.

ROBERT H. FETTA.

Witnesses:
R. W. RANDLE,
R. E. RANDLE.